(12) United States Patent
Celis

(10) Patent No.: US 6,341,302 B1
(45) Date of Patent: Jan. 22, 2002

(54) EFFICIENT INTER-TASK QUEUE PROTOCOL

(75) Inventor: Pedro Celis, Austin, TX (US)

(73) Assignee: Compaq Information Technologies Group, LP, Houston, TX (US)

( * ) Notice: Subject to any disclaimer, the term of this patent is extended or adjusted under 35 U.S.C. 154(b) by 0 days.

(21) Appl. No.: 09/160,367

(22) Filed: Sep. 24, 1998

(51) Int. Cl.[7] ............................................. G06F 9/00
(52) U.S. Cl. ............................ 709/100; 709/104; 707/8
(58) Field of Search ................................. 709/100, 101, 709/102, 103, 104, 107; 711/144; 707/8, 9; 710/113, 129

(56) References Cited

U.S. PATENT DOCUMENTS

| | | | | |
|---|---|---|---|---|
| 5,129,084 A | * | 7/1992 | Kelly, Jr. et al. | 709/104 |
| 5,297,283 A | * | 3/1994 | Kelly, Jr. et al. | 709/104 |
| 5,367,643 A | * | 11/1994 | Chong et al. | 710/129 |
| 5,550,988 A | * | 8/1996 | Sarangdhar et al. | 710/113 |
| 5,666,514 A | * | 9/1997 | Cheriton | 711/144 |
| 5,666,523 A | * | 9/1997 | D'Souza | 712/229 |
| 5,893,155 A | * | 4/1999 | Chenton | 711/144 |

\* cited by examiner

Primary Examiner—Majid A. Banankhah
(74) Attorney, Agent, or Firm—Pennie & Edmonds LLP

(57) ABSTRACT

In a system for executing database queries, a directed graph of logically interconnected tasks represents an execution plan for executing a specified database query. A pair of queues are stored in a computer memory for each pair of interconnected tasks in the directed graph. One of the queues in each pair is a down queue for sending requests from a parent task to a child task, and the other is an up queue for sending replies from the child task to the parent task. Each queue is a circular buffer and includes a head pointer that points to a next location in the queue to be read, and a tail pointer that points to a next location in the queue in which data can be written. Each task checks that a queue is not full before writing data into that queue, and checks that the sibling queue is not empty before reading data from the sibling queue. In addition, a task updates the tail pointer for a queue only after it has written data into the location in the queue to which the tail pointer is updated, to ensure that the other task does not attempt to read that queue location until the new data has been written into it. This queue protocol is sufficient, by itself, to ensure that tasks do not make conflicting use of the queues, despite the fact that the queues are in shared memory and are not protected by a synchronization mechanism.

8 Claims, 6 Drawing Sheets

EFFICIENT INTER-TASK QUEUE PROTOCOL

The present invention relates generally to communications between tasks that are working cooperatively, for example on executing a database query, and more specifically to a queue protocol for enabling two tasks to communicate via a pair of queues in shared memory without having to use any synchronization constructs to coordinate use of the pair of queues.

BACKGROUND OF THE INVENTION

In the context of a task execution tree, in which a parent task sends requests to one or more children tasks, each parent-child pair of tasks communicates in an asymmetric fashion. One task (the requesting task) provides requests and the other (the replying task) replies to these requests. A reply is a collection of entries that may be variable in size. Each of the reply entries is processed separately by the requester.

It is a goal of the present invention that the requesting task should be able to issue multiple requests in quick succession (essentially simultaneously, but in a defined order), and that new requests can be issued by the requesting task before replies have been received for the previously issued requests.

Additional goals or requirements of the present invention are:

Both tasks should be able to execute concurrently.

Requests from one task and replies by the other should be communicated to each other via a pair of queues that are in shared memory.

No synchronization primitives (semaphores, critical sections, spin-locks, etc.) should be required between the two communication tasks, even though they share the use of the pair of queues for communicating requests and replies.

Flow control should be accomplished by the use of a queue protocol between the tasks. Flow control is the mechanism used to prevent one task that produces excessive output from starving other tasks of resources and their ability to produce output, leading to deadlocks and other inefficiencies. The queue protocol should block operation of any task that would overflow its output queue or underflow its input queue until the respective imminent overflow or underflow condition is removed by the task sharing the use of the respective queue.

It should be implemented in an efficient manner.

SUMMARY OF THE INVENTION

In summary, the present invention is a system and method for executing database queries in which a set of task data structures representing a directed graph of logically interconnected tasks is stored in a computer memory. The directed graph represents an execution plan for executing at least a portion of a specified database query.

Also stored in the computer memory are a pair of queues for each pair of interconnected tasks represented by the set of task data structures. One of the queues in each pair is a down queue for sending requests from a parent task to a child task, and the other of the queues is an up queue for sending replies from the child task to the parent task.

Each queue is a circular buffer and includes a head pointer that points to a next location in the queue to be read, and a tail pointer that points to a next location in the queue in which data can be written. Each queue has an associated size. Further, a queue is empty when its head pointer is equal to its tail pointer; and it is full when the head pointer is equal to a next location in the queue after the location pointed to by the tail pointer.

Every task except the root task in an task execution tree reads requests from a down queue in a respective one of the pairs of queues, generates a corresponding result and writes the result as a reply into the up queue in the respective pair of queues. Similarly, all tasks except leaf node tasks write requests into one or more down queues and read the corresponding replies in the corresponding up queues.

Each task checks that a queue is not full before writing data into that queue, and checks that the sibling queue is not empty before reading data from the sibling queue. In addition, a task updates the tail pointer for a queue only after it has written data into the location in the queue to which the tail pointer is updated, to ensure that the other task does not attempt to read that queue location until the new data has been written into it. Further, each task writes and reads data to and from respective ones of the queues without first acquiring ownership of a corresponding synchronization mechanism. That is, the aforementioned queue usage protocol is sufficient, by itself, to ensure that two tasks do not make conflicting use of the queues, despite the fact that the pair of queues are in shared memory and are not protected by a synchronization mechanism. In effect, the head and tail pointers and the queue protocol rules act as a de facto synchronization mechanism.

In some implementations, the tasks in the task tree may be divided for execution into two or more processes. For instance, a first plurality of the tasks may be executed in a first process, and a second plurality of the tasks may be executed in a second process. A first interprocess communication task in first process and a second interprocess communication task in the second process exchange interprocess communication messages so as to communicate requests and replies between a first task in the first process and a second task in the second process. A first pair of queues is used for sending requests and replies between the first task and the first interprocess communication task, and a second pair of queues is used for sending requests and replies between the second task and the second interprocess communication task. The first and second interprocess communication tasks and the first and second pairs of queues operate together so as to simulate operation of a single pair of queues for communicating requests and replies between two tasks in a same process.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Computer System

Figure 1:
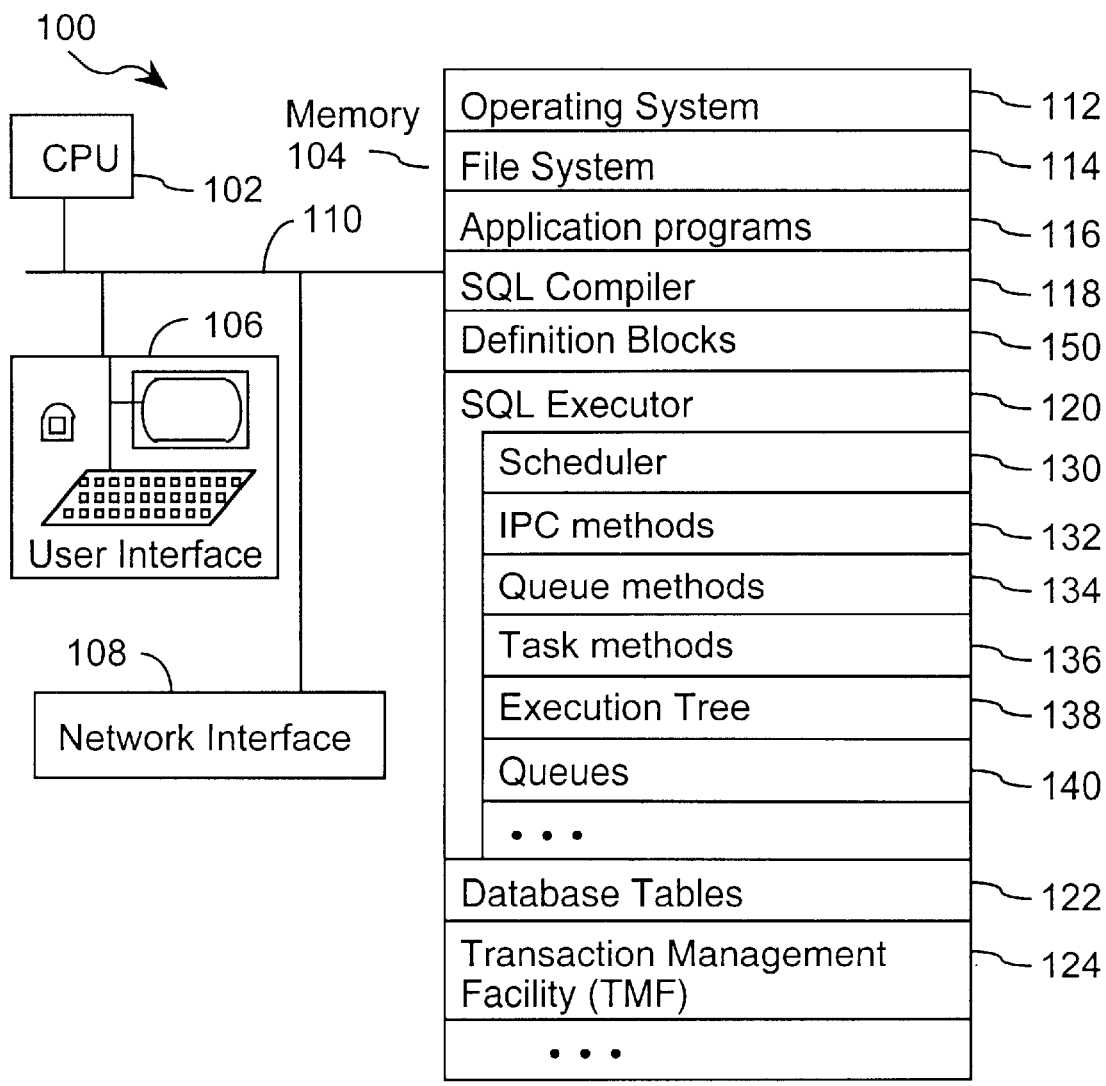
FIG. 1 is a block diagram of a computer system in which an embodiment of the present invention is implemented.

Before describing the operation of the invention, a computer system 100 in which an embodiment of the invention is implemented will be described with reference to FIG. 1. The computer system 100 includes:

one or more data processing units (CPU's) 102, memory 104, which will typically include both high speed random access memory as well as non-volatile memory;

a user interface 106; a network or other communication interface 108 for communicating with other computers; and one or more communication busses 110 for interconnecting the CPU(s) 102, memory 104, user interface 106 and network interface 108.

The number of CPU's can be greater, for instance, in a symmetric multiprocessor system.

The computer system's memory 104 stores procedures and data, typically including:

an operating system 112 for providing basic system services;

a file system 114, which may be part of the operating system;

application programs 116, such as programs executed in user address spaces on behalf of users of the system 100;

an SQL compiler 118, for compiling SQL statements (or more generally, database queries), and portions of SQL statements;

an SQL executor 120 for executing SQL statements;

database tables 122, for storing data; and a transaction management facility 124 that manages the execution of transactions.

The SQL executor 120, hereinafter called the executor, includes:

a scheduler 130 for scheduling the execution of tasks in an execution tree 138 (also called a task tree); the scheduler determines the order and frequency with which the tasks are executed;

a set of interprocess communication methods 132 for handling the communication of requests and replies between tasks that are in different processes (i.e., in different address spaces); the interprocess communication methods may be implemented as part of the operating system 112;

a set of queue methods 134 for handling writing and reading data to and from a set of queues 140 in accordance with a predefined queue protocol;

a set of task methods 136, which are the basic functions or procedures that can be performed by each of the tasks in an execution task tree; the task methods 136 may include specially compiled procedures and functions in addition to a library of predefined SQL methods;

an execution tree 138, which may include a number of subtrees that are located in separate processes; and queues 140, which will be described in detail below.

SQL Compiler, SQL Executor, Execution Trees

Figure 2:
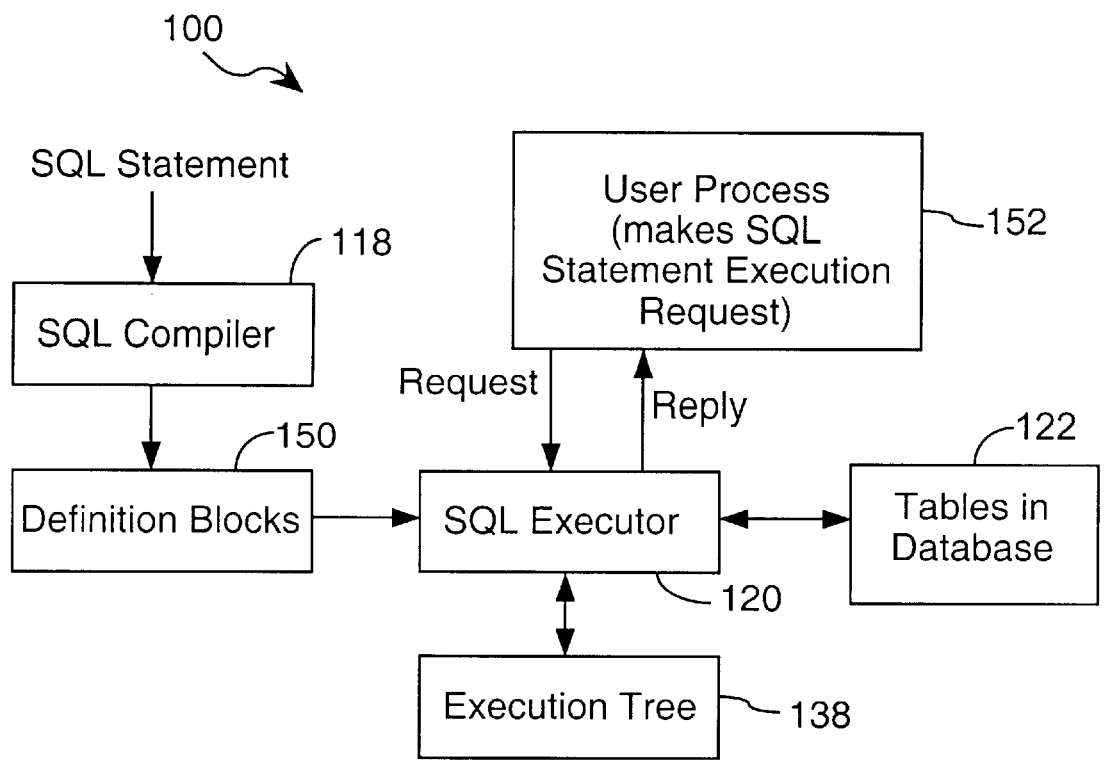
FIG. 2 depicts the relationship between an SQL compiler and an SQL executor.

Referring to FIG. 2, the SQL compiler 118 produces for the SQL executor 120 a set of definition blocks 150 from which the SQL executor 120 can build an execution tree 138. These definition blocks 150 are loaded by the SQL executor 120 and used to create control blocks (170, FIG. 3B) arranged into a graph called an execution tree 138. The execution of SQL statements is thereafter accomplished by interpreting these control blocks. In a preferred embodiment, the SQL compiler 118 does not produce any binary machine instruction code; instead it produces definition blocks 150 that the SQL executor 120 interprets.

The execution tree 138 contains all the steps necessary for executing an SQL statement, including integrity checks, firing triggers, and the body of an invoked SQL stored procedure. This tree 138 is not necessarily built as a unit by the compiler 118, but can be assembled from compiler produced fragments that are generated in separate compilations. When an SQL statement is first assembled for execution, the SQL executor 120 will read all the tree fragments, referenced by name, and assemble the execution tree 138.

Figure 3B:
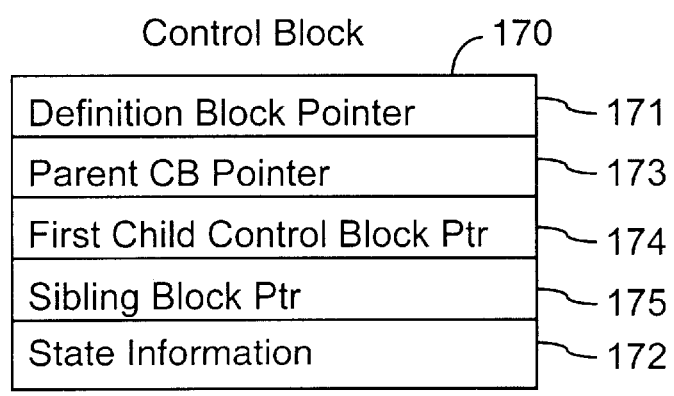
FIG. 3B depicts a control block data structure.
Figure 3A:
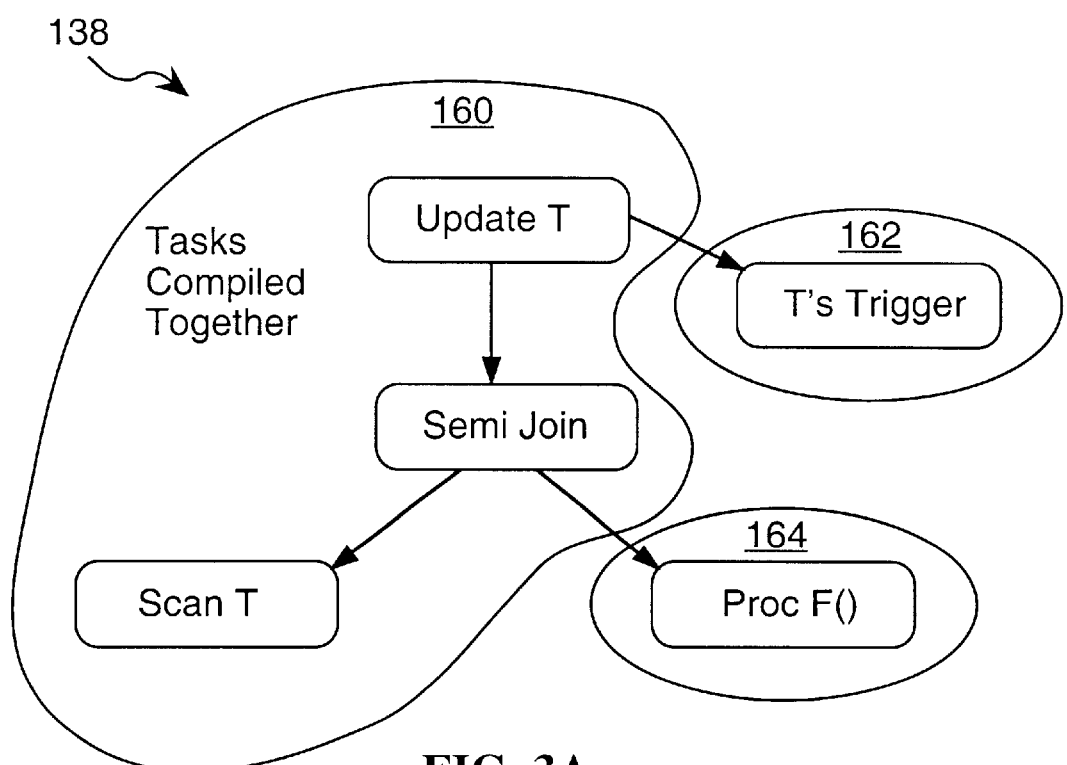
FIG. 3A depicts a task execution tree.

In FIG. 3A, each part 160, 162, 164 of the execution tree 130 that has been separately compiled is identified by a circle or other continuous loop around the tasks that were compiled together. For example the part 162 of the execution tree 138 that implements the referential integrity checks may be compiled and stored separately from the compiled form of the SQL statement that updates one of the database tables. This permits some aspects of the SQL statement to be modified, for example by adding or dropping referential constraints, without having to recompile the portions of the SQL statement that update that table. Similarly, the body of a stored procedure referenced in a statement will be compiled and stored separately (see 160 in FIG. 3A) from the compiled representation of a SQL statement that references it.

The definition blocks 150 produced by the compiler 118 are read-only data structures for the executor 120. The executor 120 builds an instance of a statement by building a graph of read/write (control block) data structures that point to the different definition blocks and contain all the state information associated with one instantiation of the statement. The blocks in FIG. 3A that contain task names correspond to these control blocks and the graph of the control blocks comprises the execution tree 138.

In the example in FIG. 3A, when the statement is first encountered by the executor 120, it will read the definition blocks associated with the statement. From them it will determine that it needs to read the definition blocks to implement the trigger and the definition blocks to evaluate the set-valued stored procedure F( ). Those other definition blocks will be produced by the SQL compiler 118 when a trigger is defined and when the stored procedure is defined, and will be stored separately from the definition blocks of the statement that references them. More specifically, in the execution tree shown in FIG. 3A, the Update T, Semi Join and Scan T tasks have been compiled together by the compiler 118, while the T's Trigger and Proc F( ) tasks have been separately compiled.

All the tasks in an execution tree may be executed by a single process, and thus operate in a shared address space. In some implementations, described below, various subsets of the tasks in the execution tree are executed by separate processes.

Referring to FIG. 3B, each control block 170 generated by the SQL executor includes a pointer 171 to a definition block 150, state information 172 about computational state of the associated task, and a set of parent 173, child 174 and sibling 175 control block pointers, which are used to form the directed graph or tree structure, an example of which is shown in FIG. 3A.

Executor Nodes

The execution tree 138 is a connection of nodes each of which represents an operator, also herein called tasks. Operators or tasks do not know about each other. That is, they communicate anonymously by a fixed set of messages.

Figure 4:
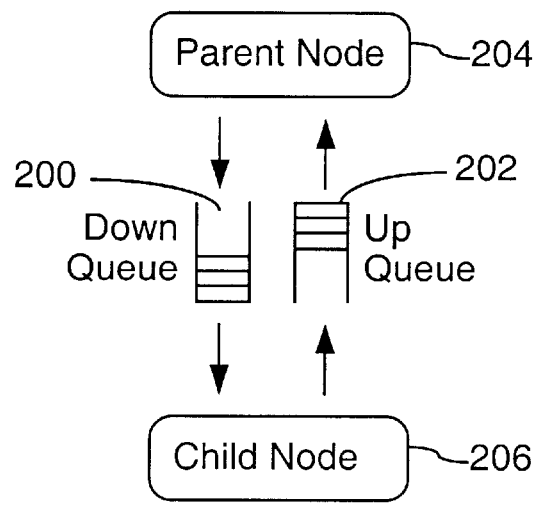
FIG. 4 depicts a pair of queues between a parent task node and a child task node.

Referring to FIG. 4, two tasks being executed by the same process (i.e., in a shared address space) interact with each other exchanging composite records through a pair of queues 200, 202. One queue in the pair (the down queue 200) is used to hold requests sent by the one task 204 (herein variously called the requester, the requesting task or the parent task) to the second task 206 (herein variously called the replier, the replying task or the child task), and the other (the Up queue 202) to hold the replies. Both queues are of some fixed size, usually different from each other. The requester 204 only inserts in the down queue 200 and deletes from the up queue 202. The replying task 206 only deletes from the down queue 200 and inserts replies in the up queue 202. As will be described in more detail below, each queue in the pair is implemented using a circular array.

Requests and replies are communicated as "composite records." The down queue 200 handles the flow of composite records from a parent task 204 to a child task 106, and the up queue 202 handles the flow of composite records from the child task 206 to the parent task 204. To send a request to the child task 206, a parent task 204 (i.e., sometimes called a node) inserts a composite record into the down queue 200 and the child node 206 reacts by inserting resulting composite records in the up queue 202 and removing the request composite record from the down queue 200. The parent and child nodes 204, 206 do not know the identity or type of the node they are communicating with.

The queues 200, 202 are in "shared memory" in that they are stored in memory that is accessible by both tasks 204 206. To prevent the tasks from making conflicting use of these queues, a "queue protocol" is used that ensures consistent use of the queues without using any synchronization constructs to limit access to the queues. The queue protocol and associated data structures are described next.

Each queue 200, 202 allows records to flow in just one direction, herein called upward or downward. For a downward flowing queue (200), only the parent inserts composite records in it and only the child removes records from it. For an upward flowing queue (202) only the child inserts composite records in it and only the parent removes them.

Queue Data Structures, Queue Protocol

Figure 5:
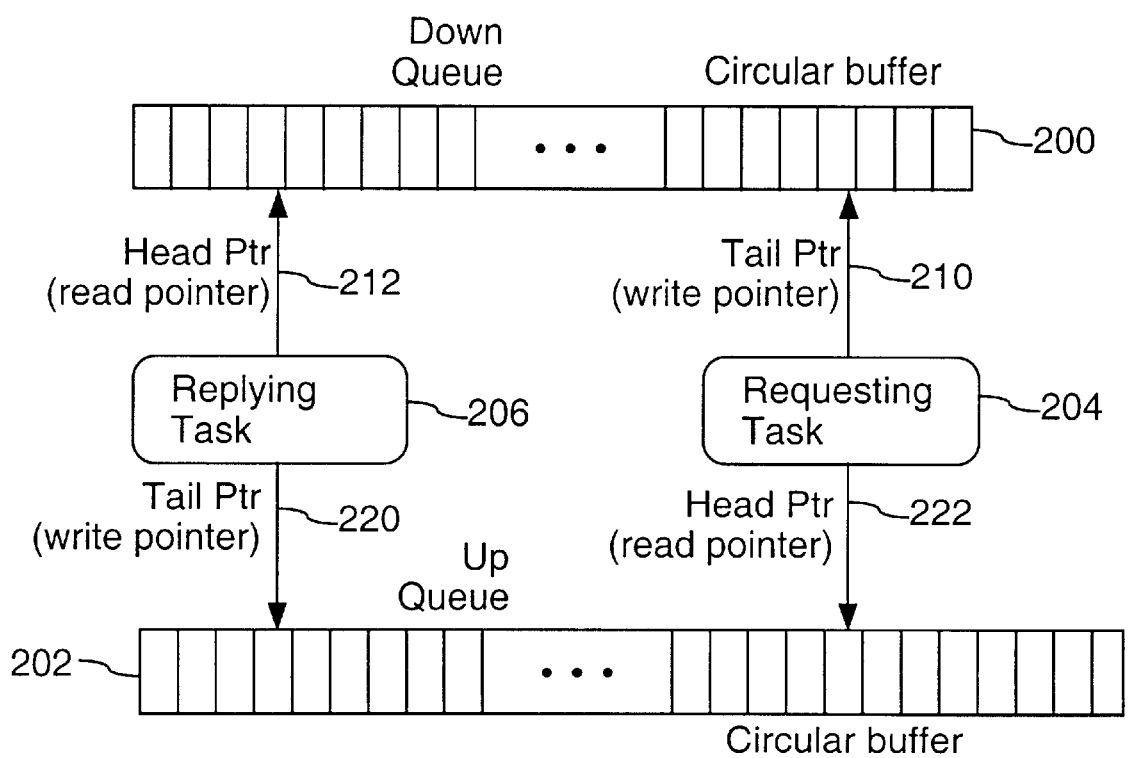
FIG. 5 depicts a pair of queue data structures and associated head and tail pointers.

Referring to FIG. 5, the down queue 200 in a queue pair has a tail pointer 210 and a head pointer 212. The tail pointer 210 points to the first empty location or entry in the down queue 200, and thus the tail pointer 210 is used as a write pointer by the requesting task 204 (i.e., the parent task) when writing a composite record representing a request into the down queue 200. The head pointer 212 points to the first (i.e., oldest) entry in the queue, and thus is used as a read pointer by the replying task 206. Similarly, the up queue 202 has a tail pointer 220 that points to the first empty location in the up queue 202 and a head pointer 222 that points to the first entry of the queue 202.

The down queue 200 and up queue are each implemented as a circular buffer. Thus, the procedure for updating the head and tail pointers of any down or up queue is:

Update head pointer:
    head=(head+1) Mod size
Update tail pointer:
    tail=(tail+1) Mod size where "head" and "tail" represent pointers to entries in the queue, "Mod" represents the modulo function, and "size" represents the number of entries (or distinct locations) in the queue.

If the head pointer (head) is equal to the tail pointer (tail), then the queue is empty. If (tail+1) Mod size=head then the queue is full. In other words, the queue is full if the next location after the tail location is the same as the head location. Hence the queue can hold a maximum of size−1 entries.

Inserting into the queue is done by first checking to see if the queue is full,

If (tail+1) Mod size=head
        {Return } // task exits
modifying the contents of the tail entry only if the queue is not full, Queue(tail)=new value
and then updating the tail to point to the next position in the queue:

tail=((tail+1) Mod size).
Deleting from the queue is accomplished by first checking to see if the queue is empty, If tail=head
        {Return } // task exits without deleting queue entry
and updating the head to point to the next position in the queue only if the queue is not empty:

head=((head+1) Mod size).
Thus, when the queue is empty, the receiving task cannot delete from it, and when it is full the sending task cannot insert into it.

The following rules govern all access to the contents of the queues and all updating of the queue pointers.

Rule 1. Each end-point of the queues in the pair of queues is only modified by a single task as follows:

The head of the down queue is only modified by the replying task.
    The tail of the down queue is only modified by the requesting task.
    The head of the up queue is only modified by the requesting task.
    The tail of the up queue is only modified by the replying task.

Rule 2. When a task modifies an end-point that it controls, the only modification allowed is to increment (modulo size) the end-point pointer. For example a task cannot insert an entry at the tail and later change its mind and decrement the tail pointer to remove it from the end of the queue.

The task that is not allowed to modify a particular endpoint of a queue can nevertheless read the value of that endpoint to check if the queue is empty or full. The other task may be in the process of changing that value, but since the value can only change in one way (increment) the consequence of seeing the old value is simply that the read is serialized before the update. That is, the reader task may not see the new entry being inserted or the new space made available until the next time it checks the endpoint value. As a result, the reader task may, on occasion, be stalled slightly longer than necessary, until the next time it is activated by the SQL executor; but this potential inefficiency is deemed by the inventor to be no more significant than the inefficiency introduced by other systems through the use of synchronization constructs. Both tasks are free to update the endpoints they control and to read the ones they don't without regard to what the other task is doing at that time.

No semaphore, critical section or locking scheme is necessary between the tasks to read/modify the endpoints provided each of them follows the rules described above.

That is, the aforementioned queue usage protocol is sufficient, by itself, to ensure that two tasks do not make conflicting use of the queues, despite the fact that the pair of queues are in shared memory and are not protected by a synchronization mechanism. In effect, the head and tail pointers and the queue protocol rules act as a de facto synchronization mechanism.

Parent Node with Multiple Child Nodes

Figure 6:
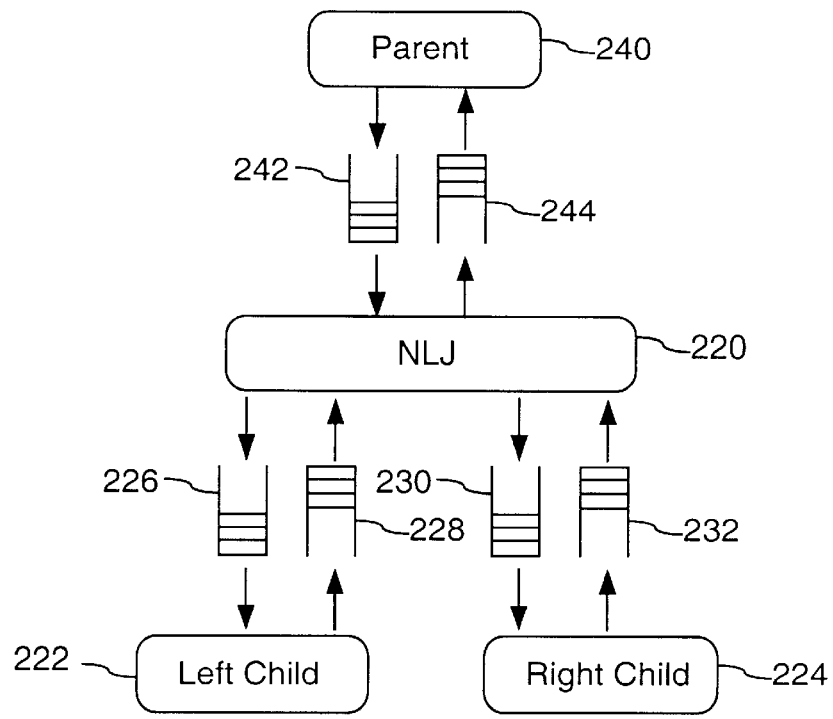
FIG. 6 depicts a parent task node having two child task nodes, and the corresponding queue pairs.

For example, referring to FIG. 6, a nested loop join (NLJ) operator 220 communicates with two child nodes 222, 224 in addition to its parent node (not shown). It receives from its parent 240 a composite record with a request to find all the matching rows for the composite record. The NLJ node 220 will give the composite record to its left child 222, via down queue 226, with the same request. For each composite record returned by the left child 222 (via up queue 228), it is given to the right child 224 (via down queue 230) with the request to find all the matching records. When the left child 222 has produced all the matching records (via up queue 232) it will remove the input composite record from its input queue 226. Similarly for each row given to the right child 224 it will produce all matching rows for that row and then remove it from its input queue 230. The nested loop join operator itself will follow the same pattern. When the result of the join for a given input record is completely produced (via up queue 244) the NLJ operator will remove the input row from its input queue 242.

This data-flow implementation of the executor allows for concurrent or overlapping work to be performed on rows as they flow through the different stages of the execution plan. While the left child 222 of the NLJ 220 is working on producing more rows (or waiting for a reply from disk file reading process) the right child 224 can be working on obtaining matches on the rows already produced.

The logic of each operator consists of checking the state of its queues and deciding what values to send and retrieve from each queue. For example, in C++ terms, each operator's class is a member of a superclass which has a number of virtual functions defined for the different activities that an operator may do. Assume that a virtual function called "work" is defined in this superclass and is invoked whenever an operator has some work to do in reading or writing to its queue end-points. For the NLJ operator the logic would be something similar to the following.

```
ex_NLJ::work(ex_control cntrl){
    while(1){
        switch (cntrl.which_queue)
        {
            case parent: // send new row to left
               break;
            case left: // build new row for right
               break;
            case right: // apply predicate
               // pass row to parent
            default: return OK; // nothing more to do
        }// end switch on which queue
    }// end infinite loop
}; end work for NLJ
```

When the work procedure for each operator's class is called on an instance of an operator it will do as much work as possible moving things in and out of the queue endpoints, applying predicates, sending no-waited messages to other processes and will return when there is no more work it can do until it receives more input, or its output is consumed or receives replies to its messages.

Remote Execution

Figure 7:
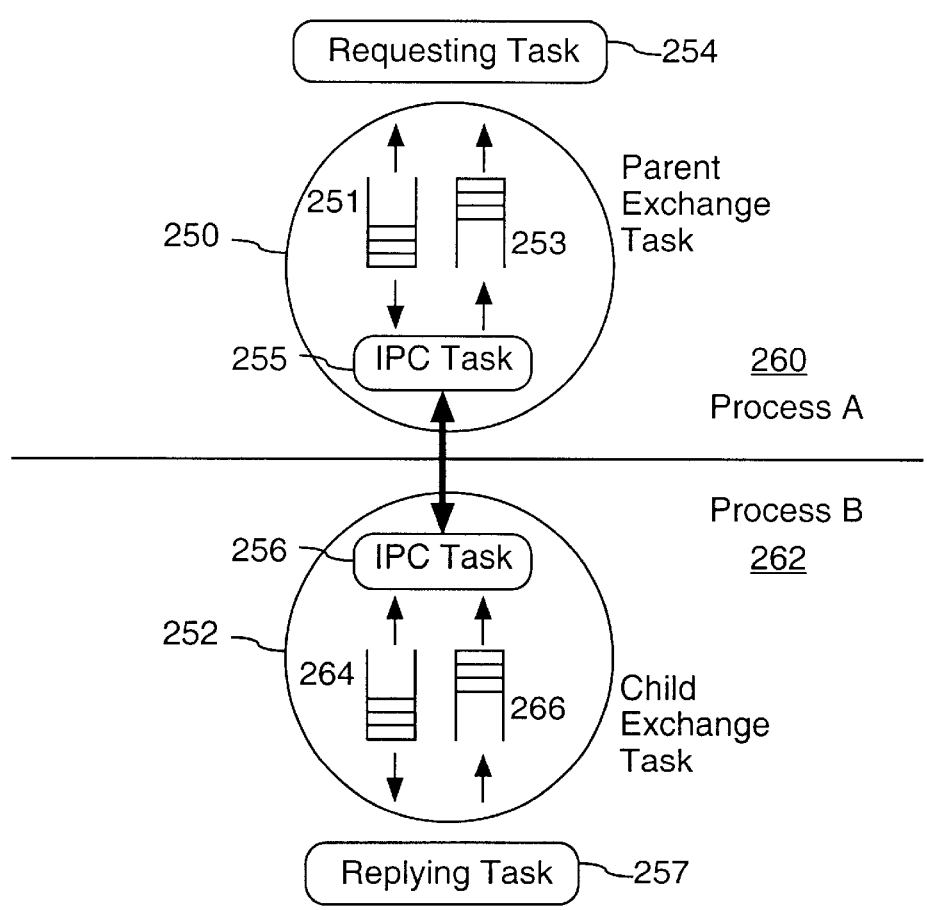
FIG. 7 depicts two tasks in separate processes and the mechanisms used to exchange requests and replies between them.

Referring to FIG. 7, parts of the execution trees could be executed by a remote process. This is accomplished by inserting in the execution tree two nodes 250, 252 to perform the exchange of composite records. For example the right child (224 in FIG. 6) of the join node 220 could be replaced by a parent exchange node 250 (FIG. 7). The down and up queues 251, 253 in the parent exchange node 250 replace the down and up queues 230, 232 associated with the right child node 224.

In this example the requesting task 254 would be the NLJ node 220, which is executed by a first process 260. An IPC (interprocess communication) task 255 in the parent exchange node 250 takes the composite records representing requests from the join node and sends them to another process 262. The other process 262 has a root node 252 that is a child exchange node. The child exchange node receives composite records and requests through its own IPC (interprocess communication) task 256 and sends them via a down queue 264 to an executor sub-tree (represented here by replaying task 257). It sends the composite records returned (via up queue 266) by the executor sub-tree back through the IPC task 256, which sends them as ipc messages to the parent exchange node 250, which in turn returns them to the join node 254/220 via up queue 253. The join node 254/220 is unaware of how the composite row returned to it was obtained. These exchange nodes 250, 252 can be inserted between any parent-child to execute part of the tree remotely.

Multiple implementations of exchange send/receive operators are possible. Only the send and receive exchange nodes need to agree on the interprocess protocol used to communicate. The protocol has several layers. One of them is the communication services that will be used as a message transport service. An implementation of such a pair may use TPC/IP services, while a different implementation may use Tandem's Guardian message system. Another layer is the TP monitor or CORBA services used to find and create the remote processes. Each parent exchange task node may be responsible for creating and destroying its own remote process, or it may use the services of a TP monitor to handle and share a pool of such processes. ??>> The section on TP monitor services below continues this discussion.

Glue Nodes

Figure 8:
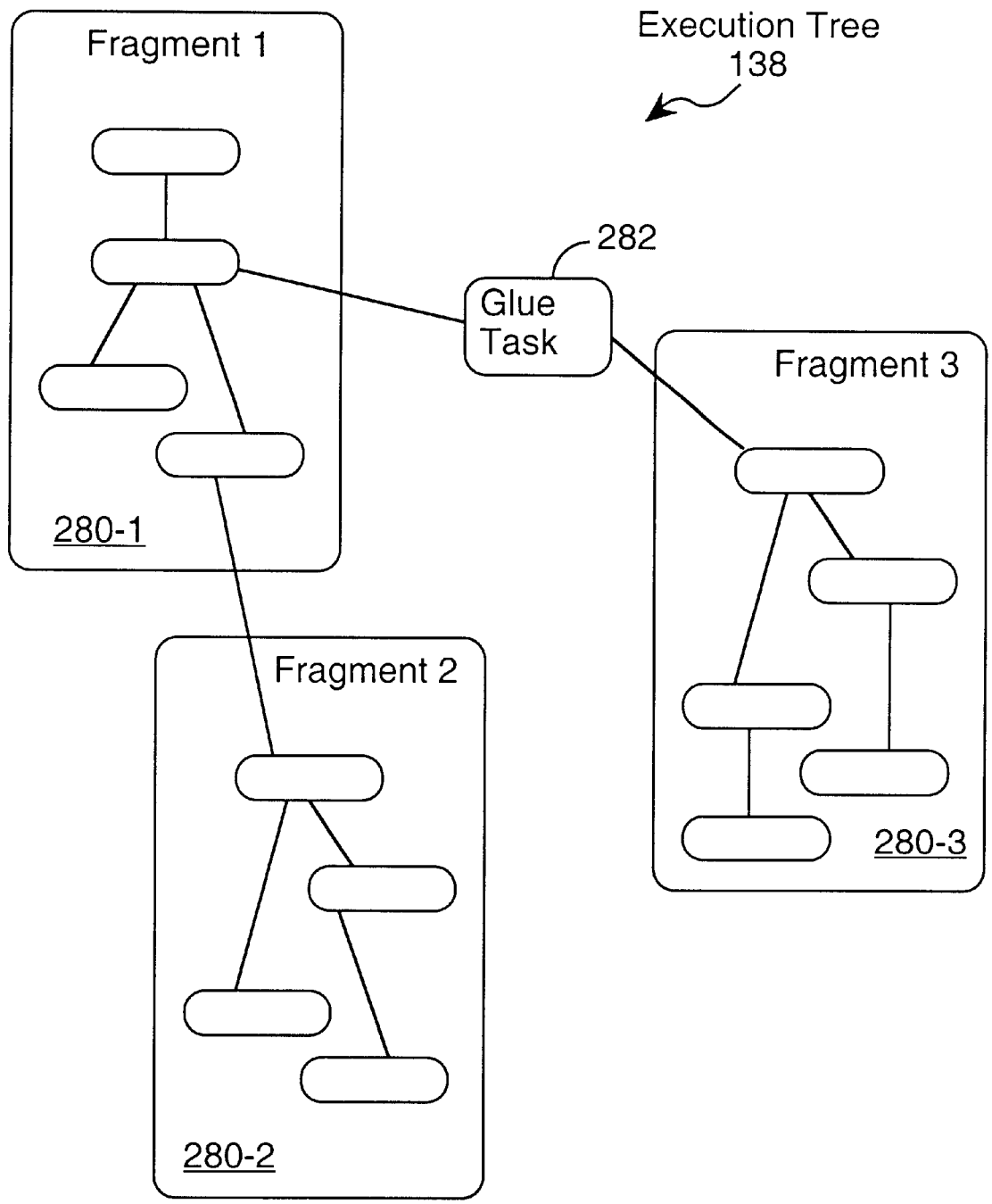
FIG. 8 depicts a task tree in which fragments of the tree have been separately compiled, and a glue task is used to convert data being exchanged by one pair of tasks that utilize distinct data formats internally.

Referring to FIG. 8, an execution tree 138 may be formed by the SQL executor from several "fragments" 280, each of which represents a separately compiled portion of an SQL statement. The tasks in a fragment exchange data, in the form of composite records, in a format that is expected by the other tasks in the fragment. In other words, since the tasks were compiled together, the format of each data field sent by a task to another task in the fragment is the same as the format for that data field that is expected by the receiving task in the fragment.

However, when the sending and receiving tasks were not compiled together and thus are in different fragments, it is quite possible for the format of a data field sent by a first task to be different from the format of that data field that is required by a second, receiving task. Similarly, the order of the data fields in a composite record sent by the first task may be different from the order of the data fields expected by the second, receiving task. In a preferred embodiment, the SQL executor checks the format of the composite records to be sent and received by tasks in different fragments for inconsistencies. When any such inconsistencies are detected, the SQL executor inserts a glue task 282 between the two tasks. The sole job of each glue task is to convert composite records received from each task into the format expected by the other task, and to then pass the resulting reformatted composite records to their intended receiving task.

Parallel Execution

Figure 9:
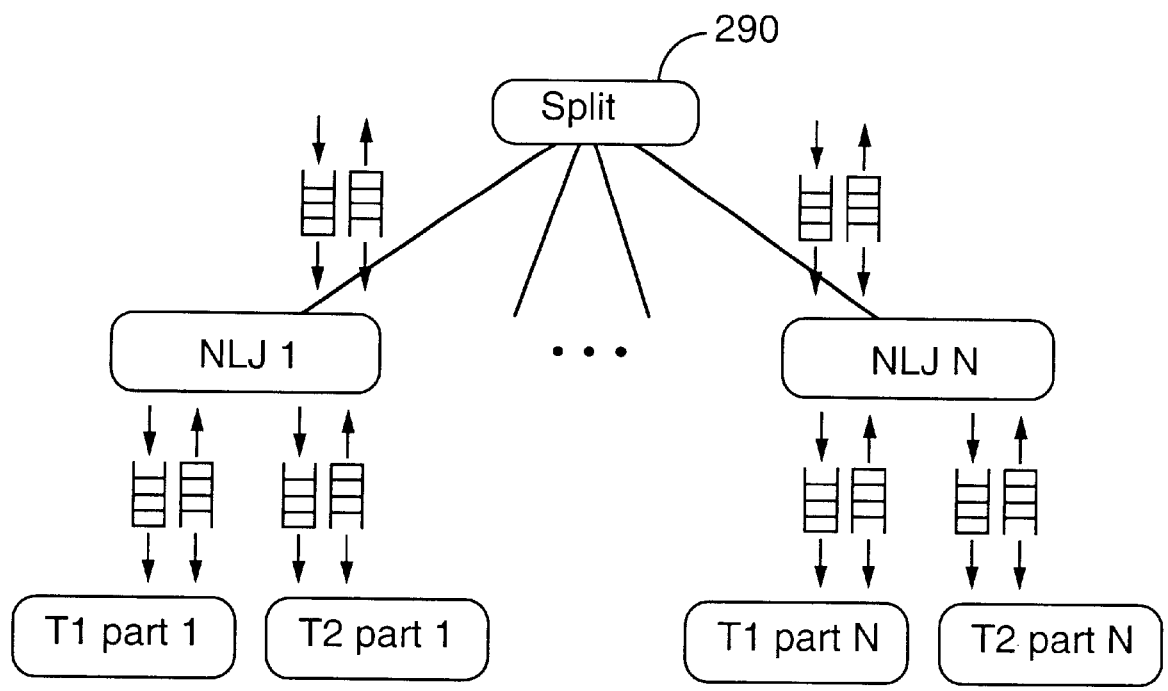
FIG. 9 depicts a task subtree suitable for dividing a task into two or more parallel tasks, which may speed execution in systems having multiple processors and/or multitasking.
Figure 10:
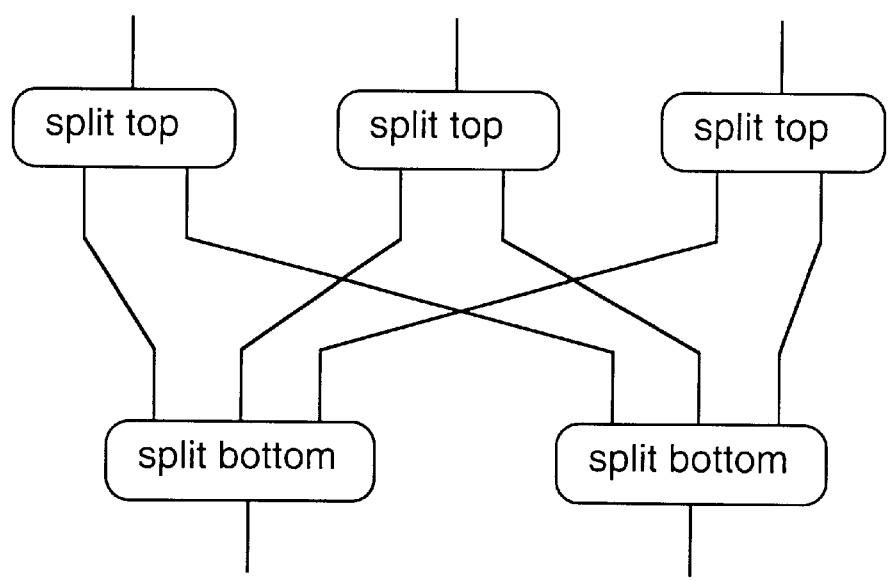
FIG. 10 depicts a task subtree suitable for moving data generated by two tasks (or data streams) that are executed in parallel into three tasks (or data streams) that are executed in parallel.

Referring to FIGS. 9 and 10, parallel execution is accomplished by inserting "split and combine nodes" 290 in an execution tree. For brevity we will call such nodes split nodes. A split node receives a request from its parent and issues requests to its several children, using the pairs of queues for communication of requests and replies, as discussed above. The children may be interprocess exchange nodes that communicate with remote processes. Alternately, the children nodes may execute in parallel threads within a single process. The split node receives the composite rows back from the multiple streams and concatenates them or merges them. If a different communication protocol is needed for a particular data stream, the interprocess exchange node for that data stream can be replaced an appropriate exchange node, without affecting the logic of the split node.

A split node typically propagates requests from its one parent to its multiple children and merges the result of the multiple children. Split nodes are sufficient to represent a large set of parallel plans. But they are not sufficient to represent plans where the data stream is repartitioned without using temporary tables.

Repartitioning occurs when rows belonging to B data streams are repartitioning into T data streams based on some value computed from the row. It is a generalization of the split operator, but two parameters are important: the number of data streams after repartitioning (top data streams), and the number of data streams before repartitioning (bottom data streams).

In FIG. 10, the two data streams that are executing in parallel feed rows into three data streams that are executed in parallel.

Executor Scheduler

Each executor node (often called a "task" in the discussion above) can be scheduled to execute independently since it takes all its input and output from its queues and does not require any other procedure to be executed in any particular order or to be active (in scope) at any particular time. Each executor node is basically a very small task that has a definition block (read-only), a control block (read-write state) and a number of queue endpoints, some of which are read-only and some are write-only. All the state of this node/task is kept in the control block (see FIGS. 3A, 3B).

A scheduler 130 (FIGS. 1, 2) gives control to a task (executor node) to perform its work. The scheduler has a large degree of freedom in scheduling tasks since they do not require to be activated in any particular order. To do useful work a task only requires certain data to be present in its input queues. Each executor node may have different requirements though. A nested loop join needs data in any of its queues. A merge-union node requires data in both of its children or on its parent queues to have some work to do.

It is possible to have several threads in the same process working on the same statement. This is an advantage only in multiprocessor implementations where multiple CPU's may be available to work in parallel on the SQL statement. Each thread can be working on some task in the execution tree, but each task can only be activated by one thread at any time.

Tasks, as defined by the present invention, are designed to be thread-safe, to not require any stack space to hold its state between activations and to be able to be executed concurrently with any other tasks in the same tree. "Thread safe" means that the code in an executor task should not manipulate the global state, should not block the process, and should use only thread safe interfaces to manage common (process) resources, like allocating memory from a pool.

The "no stack space" requirement is more of a property than a restriction. A task gets activated when a scheduler running in a thread calls the procedure that corresponds to the task. The task then manipulates its queues and returns to the scheduler. It follows that all its state must be stored in the control block 170 (FIG. 3B) since no stack is preserved between invocations of the task. The work procedures of a task will be invoked multiple times, returning when it has nothing more to do and preserving all its state for the next invocation in the control block.

The concurrent invocation requirement is satisfied for the most part by meeting the thread-safe requirement. However, if multiple threads are active simultaneously, additional concurrency restrictions must be implemented in the structures with which the executor tasks communicate. In particular, the queue protocol implements such additional concurrency restrictions.

Threads and SQL Contexts

Generally, threads must operate independently of each other. For example two threads may be working on servicing requests for different clients and both may need to open the same cursor (at the same time). Each thread must be able to issue SQL calls without being constrained by what SQL requests the other threads are issuing.

An SQL context includes things like what control statements or set statements are in effect, what cursors are open and what is the currency in each of them, which dynamic SQL statements are prepared, what is the userid of the client executing the statements, and so on. A thread that has not made any SQL calls is given a new SQL context when it performs its first SQL request. A thread may request to save a SQL context and receives back a context handle. It can then restore the context on that thread, or a different one, using the handle.

SQL Clients

The client that executes an SQL statement will be running a (perhaps incomplete) copy of the SQL executor. It may use an executor server process to perform most of the work associated with the SQL statements. Executor server processes will be used not only for the purpose of parallel execution but also to simply execute some work remotely. For instance, an SQL statement could be compiled to run all of the SQL statements on server system and only perform the top level node that interfaces with the client on the client system. Alternatively, it could perform sort and join logic (for example) on the client and communicate with disk processes to perform each side of the join.

Executor Server Processes

Executor server processes (ESP's) can execute a portion of an execution tree on behalf of a client. The ESP receives from the parent the control blocks of the executor sub-tree it wants to execute and requests to initialize it, open it and close it.

The client executor and the server ESP communicate through the use of interprocess exchange nodes. When a client executor wants to execute part of a statement remotely in an ESP it must initially provide the ESP with the portion of the plan it will execute. After that it can execute the same statement multiple times using this ESP without needing to load the execution sub-tree again.

In one implementation, each client executor creates its own ESP's and destroys them when they are idle. Preferably, however, each ESP can do work for multiple, different clients. The main motivations for wanting to share an ESP server between clients are that the number of such clients is very large, clients often experience long idle periods, and it would be very inefficient to require each client to have a dedicated server. As the number of clients increases, the number of servers can be increased linearly at a many to one ratio. The actual ratio can be determined dynamically, depending on the level of activity of the clients.

For an ESP to be able to serve multiple clients it is important that the executor allow different users' contexts to be in effect for different "statements" or execution trees. Each client process can have its state stored in a separate SQL context in the ESP.

ESP's can be shared by clients in at least two fashions: a serially reusable ESP and a multi-request ESP. In a serially reusable mode, when an ESP starts a context sensitive conversation with a client, the ESP cannot be used by any other client. When the conversation reaches an end (the executor sub-tree is closed) the ESP can do work for another client. In this model, the ESP maintains very little active context for a client between conversations. For example it will keep the definition of the executor sub-trees sent and initialized by the parent executor. This context can be recreated in a new ESP if there is a need to assign a different one between conversations.

If an ESP can work on multiple conversations with parent (i.e., client) processes, the picture does not change from the parent perspective. But the ESP is free to do work on requests from other parents while a conversation with a particular parent is in progress. An advantage of a multiple conversation ESP over a serially reusable one is that the total number of ESP's needed is significantly reduced if parents have substantial think time during conversations with ESP's.

TP Monitor

A very flexible way of moving SQL services to the workstation based client is to move the SQL executor to the client and allow the executor to farm out requests to ESP's through a TP monitor. For efficient execution, the system must use context-sensitive communications between the client and the server. A client can be rebound to a new server at well defined points in their interactions but there are cases where the same server must be used for a sequence of requests. A failure of a server may cause a client session to be aborted and the client software must restart the session. Therefore the state of the client session on the server is exportable to other servers.

The interprocess exchange nodes are the only portions of the executor that need to understand how communication between processes is handled and how the ESP will be created or found to hold a conversation.

Stored Procedures

Stored procedures are ways for the user to define a way of computing some value that can be used in an SQL statement. The data type returned by a stored procedure could be a scalar value, a row value, or a table value. The type is determined when the procedure gets declared to the SQL system. A stored procedure invocation can be placed anywhere a value of the same class could be placed. For example a stored procedure invocation of a type that is a table can be placed anywhere a table expression could be placed, e.g. in a FROM clause. The invocation could be part of an embedded SQL statement, a dynamic SQL statement, a trigger definition, another procedure definition, etc.

The SQL executor can invoke three types of stored procedures: built-in procedures, SQL defined procedures and externally defined procedures. Built-in procedures are pre-defined to the SQL system. Most of them return scalar values (built-in functions).

SQL defined procedures are defined (and declared) in a language understood by the SQL compiler and are interpreted by the SQL executor. The compiler attempts to parallelize them where appropriate. The language in which stored procedures are written includes flow control statements, invocation of other procedures (regardless of type), and the like.

External procedures are declared to the SQL system but are defined externally to it. External procedures can be invoked in any place that the other type procedures can be invoked. What a stored procedure does is unknown to the SQL system, hence the SQL system cannot guarantee statement atomicity. That is, it cannot guarantee that all effects of a failed statement failure will be undone. However, depending on the way the external procedure is executed, its effects may be part of the TMF transaction or savepoint and will not be able to commit independently of the rest of SQL statement. For built-in and SQL defined procedures, the SQL system provides the same atomicity guarantees as if the procedure statements were specified directly instead of through a defined stored procedure.

SQL Defined Procedures

SQL defined procedures will be compiled by the SQL compiler when they are defined. The compiler will produce an interface definition and a number of definition blocks that can be picked up by the SQL executor when loading a statement that references a stored procedure.

A procedure that is a set-value procedure can appear anywhere a table reference can appear. When first executing such a statement, the reference to the stored procedure control block will be replaced with the actual operators that can be used to generate rows in that set-value. The execution of the statement after that point is unaware of the fact that some portions of the execution tree were compiled separately when the procedure was defined.

Procedures that are scalar-value procedures do not appear as operators in an execution tree but are handled by the expression evaluation logic. When an expression is loaded for execution, the procedure/function expression evaluation blocks will be obtained and inserted in the expression.

3GL Constructs

3GL constructs such as loops, conditional (IF-THEN-ELSE) statements, and flow-of-control (e.g., BREAK, RETURN, WHILE) statements can appear in a procedure body or in the body of any SQL statement, trigger or constraint. These constructs are understood by the SQL compiler and the SQL executor is responsible for evaluating them. There are multiple optimization opportunities with this approach. In particular, FOR loops that are iterating over the result of a select statement constitute a join between that result set and the loop body. The SQL executor can therefore parallelize such joins using the same techniques we exploit to parallelize other joins. It is also possible to commute the order in which loops are followed.

Composite Records

Composite records are exchanged between each pair of executor nodes. For efficient execution we do not want to be copying record data at all within a single process. Composite records are represented in such a fashion to allow for very efficient passing and "copying".

Composite records are internally represented as a pointer to an array of pointers to record fragments. Creating a new composite record means "allocating" a new array of pointers and modifying some of the pointers from the previous composite record. Record fragments are usually obtained from table scans. In some cases (like aggregation) they are computed by the executor. When a process boundary is crossed, record fragments need to be copied across the process boundary and the arrays of pointers to them rebuilt in the new process.

Executor nodes do not understand anything about the internal representation of a record fragment. They build new composite records by putting together pointers to record fragments. It can call an expression evaluator to compute predicates on records and to side-effect record fragments. The expression evaluator understands the internal format of record fragments as well as the representation of a composite record as an array of pointers to record fragments.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for executing database queries, comprising:
    a set of task data structures representing a directed graph of logically interconnected tasks, the directed graph of logically interconnected representing an execution plan for executing at least a portion of a specified database query;
    an executor module for executing the tasks represented by the set of task data structures;
    a pair of queues for each pair of interconnected tasks represented by the set of task data structures, one of the queues in each pair comprising a down queue for sending requests from a parent task, comprising a first one of the pair of tasks, to a child task, comprising a second one of the pair of tasks, and the other of the queues in each pair for comprising an up queue for sending replies from the child task to the parent task, each reply corresponding to one of the requests;
    each of a first subset of the tasks including means for reading requests from a down queue in a respective one of the pairs of queues, for generating a corresponding result and for writing the result as a reply into the up queue in the respective pair of queues;
    each of a second subset of the tasks including means for writing requests into a down queue in a respective one of the pairs of queues, for reading a corresponding reply in the up queue in the respective pair of queues;
    wherein
        each task includes queue fullness checking means for checking that a first respective one of the queues is not full before writing data into the first respective queue, and queue empty checking means for checking that a second respective one of the queues is not empty before reading data from the second respective queue; and
        each task writes and reads data to and from respective ones of the queues without first acquiring ownership of a corresponding synchronization mechanism.

2. The system of claim 1, wherein
    each queue is a circular buffer and includes a head pointer that points to a next location in the queue to be read, and a tail pointer that points to a next location in the queue in which data can be written;
    each queue has an associated size;
    each queue is empty when its head pointer is equal to its tail pointer; and
    each queue is full when the head pointer is equal to a next location in the queue after the location pointed to by the tail pointer.

3. The system of claim 2, wherein
    each task writes data to the respective one of the queues only at the location pointed to by the respect queue's tail pointer and increments the tail pointer to point to a next location in the queue only after it has finished writing data into the location in the queue to which the tail pointer points;
    each queue's tail pointer is updated only by the task that writes data to that queue; and
    each queue's tail pointer is never decremented to point to an immediately previous location in the queue.

4. The system of claim 1, wherein
    a first plurality of the tasks are executed in a first process, and a second plurality of the tasks are executed in a second process;
    the tasks include a first interprocess communication task in the first process and a second interprocess communication task in the second process, the first and second interprocess communication tasks exchanging interprocess communication messages so as to communicate requests and replies between a first task in the first process and a second task in the second process;
    a first one of the pairs of queues is used for sending requests and replies between the first task and the first interprocess communication task; and a second one of the pairs of queues is used for sending requests and replies between the second task and the second interprocess communication task; and first and second interprocess communication tasks and the first and second pairs of queues operate together so as to simulate operation of a single pair of queues for communicating requests and replies between two tasks in a same process.

5. A method of executing database queries, comprising:

storing in a computer memory a set of task data structures representing a directed graph of logically interconnected tasks, the directed graph of logically interconnected representing an execution plan for executing at least a portion of a specified database query;

storing in the computer memory a pair of queues for each pair of interconnected tasks represented by the set of task data structures, one of the queues in each pair comprising a down queue for sending requests from a parent task, comprising a first one of the pair of tasks, to a child task, comprising a second one of the pair of tasks, and the other of the queues in each pair for comprising an up queue for sending replies from the child task to the parent task, each reply corresponding to one of the requests;

executing the tasks represented by the set of task data structures, including:
  each of a first subset of the tasks reading requests from a down queue in a respective one of the pairs of queues, generating a corresponding result and writing the result as a reply into the up queue in the respective pair of queues;
  each of a second subset of the tasks writing requests into a down queue in a respective one of the pairs of queues, and reading a corresponding reply in the up queue in the respective pair of queues;
  wherein
    each task checks that a first respective one of the queues is not full before writing data into the first respective queue, and checks that a second respective one of the queues is not empty before reading data from the second respective queue; and
    each task writes and reads data to and from respective ones of the queues without first acquiring ownership of a corresponding synchronization mechanism.

6. The method of claim 5, wherein each queue is a circular buffer and includes a head pointer that points to a next location in the queue to be read, and a tail pointer that points to a next location in the queue in which data can be written;

each queue has an associated size;

each queue is empty when its head pointer is equal to its tail pointer; and each queue is full when the head pointer is equal to a next location in the queue after the location pointed to by the tail pointer.

7. The method of claim 6, wherein each task writes data to the respective one of the queues only at the location pointed to by the respect queue's tail pointer and increments the tail pointer to point to a next location in the queue only after it has finished writing data into the location in the queue to which the tail pointer points;

each queue's tail pointer is updated only by the task that writes data to that queue; and each queue's tail pointer is never decremented to point to an immediately previous location in the queue.

8. The method of claim 5, wherein a first plurality of the tasks are executed in a first process, and a second plurality of the tasks are executed in a second process;

the tasks include a first interprocess communication task in the first process and a second interprocess communication task in the second process, the first and second interprocess communication tasks exchanging interprocess communication messages so as to communicate requests and replies between a first task in the first process and a second task in the second process;

a first one of the pairs of queues is used for sending requests and replies between the first task and the first interprocess communication task; and a second one of the pairs of queues is used for sending requests and replies between the second task and the second interprocess communication task; and first and second interprocess communication tasks and the first and second pairs of queues operate together so as to simulate operation of a single pair of queues for communicating requests and replies between two tasks in a same process.

* * * * *